United States Patent
Wang et al.

(10) Patent No.: US 8,064,425 B2
(45) Date of Patent: Nov. 22, 2011

(54) METHOD FOR ASSIGNING FREQUENCY SPECTRUM BANDWIDTH OF AN OFDM AND OFDMA COEXISTENCE SYSTEM

(75) Inventors: Ning Wang, Guangdong Province (CN);
Hexing Liu, Guangdong Province (CN);
Xiang Gao, Guangdong Province (CN);
Ying Liu, Guangdong Province (CN);
Yanwei Wu, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 678 days.

(21) Appl. No.: 11/662,956

(22) PCT Filed: Oct. 9, 2004

(86) PCT No.: PCT/CN2004/001144
§ 371 (c)(1),
(2), (4) Date: Mar. 15, 2007

(87) PCT Pub. No.: WO2006/037257
PCT Pub. Date: Apr. 13, 2006

(65) Prior Publication Data
US 2007/0286147 A1 Dec. 13, 2007

(51) Int. Cl.
*H04J 9/00* (2006.01)
*H04J 3/00* (2006.01)
*H04J 1/00* (2006.01)
*H04B 7/212* (2006.01)
*H04K 1/00* (2006.01)

(52) U.S. Cl. ........ 370/345; 370/204; 370/343; 370/347; 375/260

(58) Field of Classification Search .................. 455/448, 455/451, 452.1, 452.2, 453; 370/430, 330, 370/436, 478, 395.21, 395.3, 395.31, 395.32, 370/395.4, 395.41, 395.42, 395.43, 204, 370/345, 343, 347; 375/260
See application file for complete search history.

(56) References Cited

U.S. PATENT DOCUMENTS

| 6,347,071 | B1 * | 2/2002 | Cupo et al. ..................... 370/203 |
| 6,535,501 | B1 | 3/2003 | Bohnke |
| 6,885,630 | B2 * | 4/2005 | Kostic et al. ................... 370/203 |
| 2004/0190640 | A1 * | 9/2004 | Dubuc et al. ................... 375/260 |
| 2005/0277444 | A1 * | 12/2005 | Rensburg et al. .......... 455/562.1 |
| 2006/0050799 | A1 * | 3/2006 | Hou et al. ...................... 375/260 |

FOREIGN PATENT DOCUMENTS
CN 1358037 A 7/2002
CN 1434588 A 8/2003

OTHER PUBLICATIONS

IEEE Computer Society, "IEEE Standard for Local and metropolitan area networks, Part 16: Air Interface for Fixed Broadband Wireless Access Systems", Apr. 2002, IEEE, pp. 8, 97, 220.*
Runcom, "Harmonization of 2K OFDMA and 256 sub-channalization", Aug. 2003, European Telecommunications Standard Institute, Bran #33.5.*
Aloush et al., "Coexistence of Fixed and Mobile Services", Jan. 2003, IEEE 802.16 Broadband Wireless Access Working Group.*
International Search Report dated Jul. 14, 2005, PCT/CN2004/001144.

* cited by examiner

*Primary Examiner* — Jinsong Hu
*Assistant Examiner* — Opiribo Georgewill

(57) ABSTRACT

The present invention relates to a method for assigning frequency spectrum bandwidth of an OFDM and OFDMA coexistence system, and the base station system combines uplink and downlink data containing OFDM sub-frames and OFDMA sub-frames in a time division fashion, assigns the frequency spectrum reasonably according to the different bandwidth requirements of the OFDM and the OFDMA and the use condition of the frequency band, and constitutes a frame structure realizing the coexistence of the OFDM and the OFDMA, so as to send the OFDMA uplink/downlink data and the OFDM uplink/downlink data. The method for assigning frequency spectrum bandwidth according to the present invention can achieve a higher frequency spectrum utilization efficiency of an OFDM and OFDMA coexistence system, avoid the waste of the frequency spectrum resource of a service provider; and can also realize more flexible networking.

9 Claims, 3 Drawing Sheets

METHOD FOR ASSIGNING FREQUENCY SPECTRUM BANDWIDTH OF AN OFDM AND OFDMA COEXISTENCE SYSTEM

CROSS REFERENCE TO RELATED APPLICATIONS OR PRIORITY CLAIM

This application is a national phase of International Application No. PCT/CN2004/001144 entitled "A Method For Assigning Frequency Spectrum Bandwidth Of A OFDM And OFDMA Coexistence System", which was filed on Oct. 9, 2004.

FIELD OF THE INVENTION

The present invention relates to a method for assigning frequency spectrum bandwidth of a communication system, and especially relates to a method for assigning frequency spectrum bandwidth of an OFDM (Orthogonal Frequency Division Multiplexing) and OFDMA (Orthogonal Frequency Division Multiplexing Access) coexistence system.

BACKGROUND ART

Orthogonal frequency division multiplexing (OFDM) technology was firstly used in military field in 1960s, the modulating mode has very high frequency spectrum utilization efficiency and is suitable for wireless data transmission, so it has been used widely as a wireless access method.

OFDM system adopts multi-carrier technique, and a high speed data stream is transmitted by serial to parallel convert, so that the duration of data symbols in each sub-carrier increases relatively, and then the ISI (InterSymbol Interference) brought by the time dispersion of wireless channel could be reduced efficiently, thereby reducing the complexity of balance in a receiver, and even avoiding using an equalizer and only using the method of inserting cyclic prefix to eliminate the unfavorable influence of ISI. Orthogonality exists among the sub-carriers of the OFDM system, which permits mutual overlap of the frequency spectrum of each sub-carrier, and therefore, compared with the conventional frequency division multiplexing system, the OFDM system could maximize the use of frequency spectrum resources. FIG. 1 is a time domain wave shape view of an OFDM symbol in which the prefix is inserted cyclically.

In FIG. 1, Tb represents the effective symbol cycle in OFDM signals, Tg represents the inserted cyclic prefix, and the contents of Tg is the copy of the last part of contents in Tb period, and Ts is the cycle of the whole OFDM symbols. As long as the length of the cyclic prefix is longer than the maximum time delay extension of OFDM symbols, the orthogonality of each sub-carrier in one OFDM symbol can be guaranteed. And therefore, the multi-path interference could be overcome through inserting the cyclic prefix Tg periodically. It is usually required that the cyclic prefix should be bigger than or equal to 2 to 4 times of the maximum time delay extension when design an OFDM system, and table 1 shows the maximum time delay extension in common environments.

TABLE 1

| environment | maximum time delay extension |
| --- | --- |
| Indoor | 40 ns~200 ns |
| outdoor | 1 μs~20 μs |

It can be seen from table 1 that if the OFDM system only needs to support the wireless communication in indoor environment, usually the cyclic prefix should be bigger than 800 ns, whereas if the outdoor wireless communication needs to be supported, the cyclic prefix should be bigger than 20 μs, and because of the limitation of the time delay extension, in the condition that the FFT dots are fixed, the OFDM system should not adopt a too wide bandwidth.

In a broad sense, the OFDM system comprises OFDM and OFDMA systems, and OFDMA has the similar basic principle to that of the OFDM, while the difference of the two lies in that the bandwidth assignment of the OFDMA system is carried out in the two-dimensional interval of time and frequency, and the bandwidth of the OFDM system is only assigned on time dimension. Compared with the conventional OFDM system, the bandwidth assignment of the OFDMA system is more flexible and suitable for use in cellular networking, so it is attracting people's attention more and more.

The IEEE802.16 standard adopts OFDM and OFDMA techniques, but the two kinds of techniques are independent of each other relatively in the standard, and there is not any special definite provision on cooperative work of the two systems. From the point of compatibility, research on the coexistence system of OFDM and OFDMA is needed so that the future system could support OFDM and OFDMA techniques at the same time, and it could furthest protect the interests of investors and users.

Furthermore, to implement the coexistence of OFDM and OFDMA, it is needed to consider not only the compatibility of the frame structure to different systems, but also the limitation of cyclic prefix on the bandwidth of OFDM system and OFDMA system.

The calculating formula of the cyclic prefix in OFDM symbols is as follows:

$$T_g = G \cdot T_b = \frac{G \cdot N_{FFT}}{n \cdot BW},$$

wherein n is an over-sampling factor, and as for the OFDM system, the value of n relates to the bandwidth, and its range is basically between 1.14 to 1.15, but to an OFDMA system, the value of n generally is 8/7. And G is the cyclic prefix factor, which has 4 values as follows: 1/4, 1/8, 1/16, and 1/32. $N_{FFT}$ is the number of FFT dots.

From the formula, it can be seen that the length of the cyclic prefix is in direct proportion to G, is in inverse proportion to the bandwidth, and is in direct proportion to the number of the FFT dots. Generally speaking, the number of the FFT dots adopted by the OFDM system is smaller than that of the OFDMA system, and the OFDM system generally adopts the FFT of 256 dots, while the OFDMA system adopts the FFT of 2048 dots. To the OFDM system of 256 dots, because of the limitation of the cyclic prefix, the bandwidth can not be too wide, but to the OFDMA system of 2048 dots, in the condition of the same time delay extension, as the number of the FFT dots is 8 times as that of the OFDM system, the largest bandwidth that the OFDMA system could adopt also is 8 times as that of the OFDM system. When the OFDMA system carries out cellular networking, the bandwidth should not be too small in order to guarantee the capacity of the system. Table 2 shows the range of the cyclic prefixes of OFDM of 256 dots and OFDMA of 2048 dots in every usable bandwidth condition as follows:

TABLE 2

| FFT dots | bandwidth | Minimum cyclic prefix | Maximum cyclic prefix |
|---|---|---|---|
| 256 | 10 MHz | 700 ns | 5.6 μs |
| 256 | 7 MHz | 1 μs | 8.02 μs |
| 256 | 3.5 MHz | 2 μs | 16.04 μs |
| 256 | 1.75 MHz | 4 μs | 32.08 μs |
| 256 | 5.5 MHz | 1.45 μs | 11.64 μs |
| 256 | 3 MHz | 2.67 μs | 21.3 μs |
| 2048 | 20 MHz | 1.4 μs | 11.2 μs |
| 2048 | 10 MHz | 2.8 μs | 22.4 μs |
| 2048 | 28 MHz | 2 μs | 16.04 μs |
| 2048 | 14 MHz | 4 μs | 32.08 μs |
| 2048 | 7 MHz | 8 μs | 64.16 μs |
| 2048 | 3.5 MHz | 16 μs | 128.32 μs |
| 2048 | 17.5 MHz | 3.2 μs | 25.66 μs |
| 2048 | 8.75 MHz | 6.4 μs | 51.32 μs |
| 2048 | 1.25 MHz | 35.6 μs | 284.44 μs |

From table 2, it can be seen that if it is desired to ensure the bandwidths of the OFDM system and the OFDMA system are the same, because of the impact of the maximum time delay extension, the bandwidth should not be too high, and if the capacity of OFDMA system is taken into consideration, the bandwidth that the OFDMA system adopts should not be too low, either. Owing to the above two reasons, the bandwidth which the OFDMA system adopts may be different from that of the OFDMA system. When the bandwidths of the two systems are remarkably different from each other, to the OFDM and OFDMA time division combined frame fashion in the conventional time division fashion, the utilization rate of frequency spectrum will be very low.

Therefore, in order to improve the utilization efficiency of the frequency spectrum of the OFDM and OFDMA coexistence system, it is necessary to design an efficient method for assigning the frequency spectrum bandwidth of the system.

SUMMARY OF THE INVENTION

The main purpose of the present invention is to provide a method for assigning frequency spectrum bandwidth of an OFDM and OFDMA coexistence system, and constituting a frame structure which could meet the requirements of the said coexistence system, and assigning the frequency spectrum reasonably, the utilization efficiency of the frequency spectrum of the system can be improved.

In order to achieve the above invention object, the present invention provides a method for assigning the frequency spectrum bandwidth of an OFDM and OFDMA coexistence system, and the coexistence system comprises a base station system, characterized in that the base station system combines the uplink data and the downlink data containing OFDM sub-frames and OFDMA sub-frames in time division fashion, assigns the frequency spectrum reasonably according to the different bandwidth requirements of OFDM and OFDMA and the use condition of the frequency band, and constitutes the frame structure realizing the coexistence of OFDM and OFDMA.

The above method for assigning frequency spectrum bandwidth of an OFDM and OFDMA coexistence system, characterized in that when the OFDM and OFDMA adopt the same frequency band, and bandwidths are the same or of little difference, the method for assigning the frequency spectrum bandwidth of the system can comprise the following steps:

the base station system divides each data frame on the whole frequency band into non-continuous downlink sub-frame and uplink sub-frame on the time axis, which are respectively for transmitting the downlink data and receiving the uplink data;

the base station system divides the downlink sub-frame into an OFDMA downlink sub-frame and an OFDM downlink sub-frame on the time axis, which are respectively for transmitting the OFDMA downlink sub-frame data and the OFDM downlink sub-frame data; and the base station system divides the uplink sub-frame into an OFDMA uplink sub-frame and an OFDM uplink sub-frame on the time axis, which are respectively for transmitting the OFDMA uplink sub-frame data and the OFDM uplink sub-frame data.

The above method for assigning frequency spectrum bandwidth of an OFDM and OFDMA coexistence system, characterized in that the dividing of the said downlink data region and/or the uplink data region can be continuous or non-continuous.

The above method for assigning frequency spectrum bandwidth of an OFDM and OFDMA coexistence system, characterized in that when the OFDM and the OFDMA adopt the same frequency band, and their bandwidths are the same or of little difference, the method for assigning the frequency spectrum bandwidth of the system can comprise the following steps:

the base station system divides a frame into an OFDMA sub-frame and an OFDM sub-frame by time, which are respectively for sending the OFDMA data and the OFDM data;

the base station system divides the OFDMA sub-frame into a downlink OFDMA sub-frame and an uplink OFDMA sub-frame; and the base station system divides the OFDM sub-frame into a downlink OFDM sub-frame and an uplink OFDM sub-frame.

The above method for assigning frequency spectrum bandwidth of an OFDM and OFDMA coexistence system, characterized in that when the total frequency bands of the OFDM and the OFDMA are the same, and the bandwidths of the OFDM and the OFDMA are different, the method for assigning the frequency spectrum bandwidth of the system can comprise the following steps:

the base station system divides each data frame on the whole frequency band into a downlink sub-frame and an uplink sub-frame on the time axis;

the base station system divides the downlink sub-frame into a downlink OFDMA sub-frame and a downlink OFDM sub-frame by time, which are respectively for sending the OFDMA downlink data and the OFDM downlink data;

the region for sending the OFDMA downlink data sends an OFDMA downlink sub-frame according to the requirements of networking;

the region for sending the OFDM downlink data is divided into multiple sub-frequency bands by frequency domain, and an OFDM downlink sub-frame is sent in each sub-frequency band and the data in different frequency bands are sent in different sectors;

the base station system divides the uplink sub-frame into an uplink OFDMA sub-frame and an uplink OFDM sub-frame on the time axis, which are respectively for sending the OFDMA uplink data and the OFDM uplink data;

the region for sending the OFDMA uplink data needs to send an OFDMA uplink sub-frame by the requirements of networking; and the region for sending the OFDM uplink data is divided into multiple sub-frequency bands by frequency domain, and an OFDM uplink sub-frame is sent in each sub-frequency band and the data in different frequency bands are sent in different sectors.

The above method for assigning the frequency spectrum bandwidth of an OFDM and OFDMA coexistence system, characterized in that the frequency bands of the multiple sub-frequency bands in the region for sending the OFDM uplink data and in the region for sending the OFDM downlink data are separated by a protection band, and the frequency bands of the multiple sub-frequency bands in the region for sending the OFDM downlink data are separated by a protection band.

The above method for assigning the frequency spectrum bandwidth of an OFDM and OFDMA coexistence system, characterized in that when the total frequency bands of the OFDM and the OFDMA are the same, and the bandwidths of the OFDM and the OFDMA are different, the method for assigning the frequency spectrum bandwidth of the system can comprise the following steps:

the base station system divides each data frame on the whole frequency band into an OFDMA sub-frame and an OFDM sub-frame on the time axis;

the base station system divides the OFDMA sub-frame into a downlink OFDMA sub-frame and an uplink OFDMA sub-frame by time; and the base station system divides the OFDM sub-frame into multiple sub-frequency bands by frequency domain, and an OFDM downlink sub-frame and an uplink sub-frame are sent in each sub-frequency band and the data in different frequency bands are sent in different sectors.

The above method for assigning the frequency spectrum bandwidth of an OFDM and OFDMA coexistence system, characterized in that the frequency bands of the multiple sub-frequency bands are separated by a protection band.

The above method for assigning the frequency spectrum bandwidth of an OFDM and OFDMA coexistence system, characterized in that when the total frequency bands of the OFDM and the OFDMA are the same, and the bandwidths of the OFDM and the OFDMA are different, the method for assigning the frequency spectrum bandwidth of the system can comprise the following steps:

the base station system divides each data frame on the whole frequency band into two parts, one part is a downlink sub-frame and the other part is an uplink frame;

the base station system divides the downlink sub-frame into two sub-frequency bands by frequency domain, and the first sub-frequency band is used for sending the OFDMA downlink sub-frame, and at the second sub-frequency band, the OFDMA downlink sub-frame and the OFDM downlink sub-frame are combined in time division fashion, and the two parts respectively occupy only part of the time of the downlink sub-frame; and the base station system divides the uplink sub-frame into two sub-frequency bands by frequency domain, and the first sub-frequency band is used for sending the OFDMA uplink sub-frame, and at the second sub-frequency band, the OFDMA uplink sub-frame and the OFDM uplink sub-frame are combined in time division fashion, and the two parts respectively occupy only part of the time of the uplink sub-frame.

The above method for assigning the frequency spectrum bandwidth of an OFDM and OFDMA coexistence system, characterized in that when the total frequency bands of the OFDM and the OFDMA are the same, and the bandwidths of the OFDM and the OFDMA are different, the method for assigning the frequency spectrum bandwidth of the system can comprise the following steps:

the base station system divides each data frame on the whole frequency band into a downlink OFDMA sub-frame and an uplink OFDMA sub-frame on the time axis, which are respectively for sending the OFDMA downlink data, and part of them is used for sending the OFDMA uplink data, wherein the said downlink OFDMA sub-frame also comprises an OFDMA prefix region;

the base station system divides, in a OFDMA non-prefix-downlink data region by the frequency assigned order, a region for transmitting the OFDM downlink sub-frame; and the base station system divides, in an OFDMA uplink data region by the frequency assigned order, a region for transmitting the OFDM uplink sub-frame.

The following is a detailed description of the present invention in conjunction with the accompanying drawings and embodiments thereof, which shall not be understood as a limitation of the present invention.

BRIEF DESCRIPTION OF THE ACCOMPANYING DRAWINGS

EMBODIMENTS FOR CARRYING OUT THE PRESENT INVENTION

The present invention is further described in detail hereinafter in conjunction with the accompanying drawings and the embodiments thereof.

As described above, due to the requirements of the maximum time delay extension and the capacity of the OFDMA system, the bandwidths of the OFDM sub-frame and the OFDMA sub-frame can be the same or different, and following four methods can be adopted for the frequency spectrum utilization according to different circumstances.

If the frequency bands of the OFDM sub-frame and the OFDMA sub-frame are the same, and their bandwidths are the same or of little difference (for example, when the bandwidth of the OFDMA is less than two times of the bandwidth of the OFDM), the method for utilizing the frequency spectrum according to the first embodiment can be adopted, and the method comprises the following steps:

the base station system divides a data frame of the whole frequency band into two non-continuous parts on the time axis, one part is used for transmitting the downlink data and the other part is used for receiving the uplink data;

the base station system divides the downlink data region into two parts (which can be continuous or non-continuous, the definition of being non-continuous is that an interval can exist between the parts of the OFDMA and the OFDM in the uplink/downlink data region) on the time axis, one part is used for transmitting the OFDMA downlink sub-frame and the other part is used for transmitting the OFDM downlink sub-frame; and the base station system divides the uplink data region into two parts (which can be continuous or non-continuous, the definition of being non-continuous is that an interval can exist between the parts of the OFDMA and the OFDM in the uplink/downlink data region) on the time axis, one part is used for transmitting the OFDMA uplink sub-frame and the other part is used for transmitting the OFDM uplink sub-frame.

Figure 1:
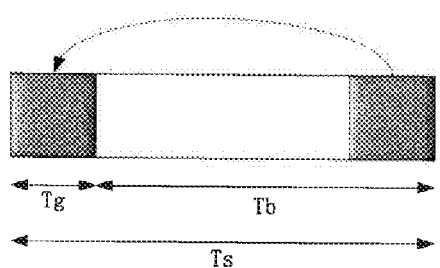
FIG. 1 is a time domain waveform view of the OFDM signal in which the cyclic prefix is added.
Figure 2:
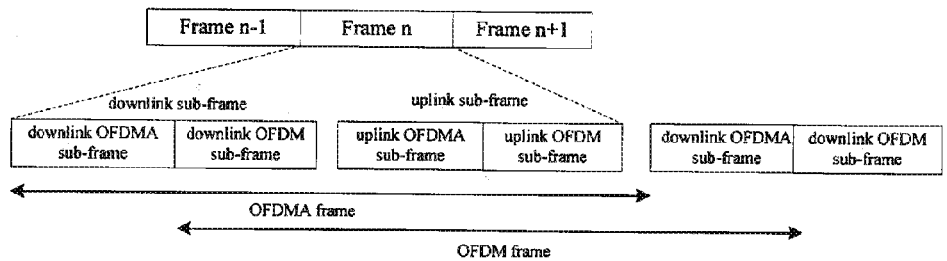
FIG. 2 is a frame format of the OFDM and OFDMA coexistence system.
Figure 3:
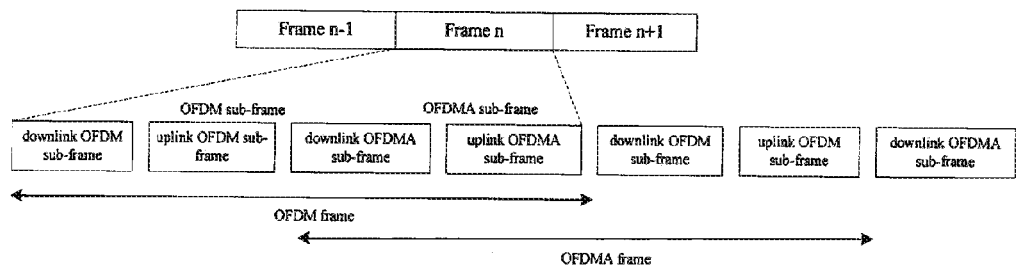
FIG. 3 is another frame format of the OFDM and OFDMA coexistence system.

FIG. 2 and FIG. 3 present the frame structure definition which might be adopted by the OFDM and the OFDMA coexistence system according to the present embodiment.

In FIG. 2, a frame is first divided into a downlink sub-frame and an uplink sub-frame, and the uplink/downlink sub-frame is respectively combined by the OFDMA sub-frame and the OFDM sub-frame in time division fashion. The downlink sub-frame comprises an OFDMA downlink sub-frame and an OFDM downlink sub-frame, and the uplink sub-frame comprises an OFDMA uplink sub-frame and an OFDM uplink sub-frame.

The method for utilizing the frequency spectrum according to the present embodiment can also be that the base station system first divides a frame into two parts by time, and one part is used for sending the OFDMA data, and the other part is used for sending the OFDM data. The OFDMA data region is divided into a downlink OFDMA sub-frame and an uplink OFDMA sub-frame, and the OFDM data region is divided into a downlink OFDM sub-frame and an uplink OFDM sub-frame. For example, in FIG. 3, an OFDM sub-frame and an OFDMA sub-frame are combined in one frame in time division fashion, a frame comprises an OFDM sub-frame and an OFDMA sub-frame, and an OFDM sub-frame comprises a downlink OFDM sub-frame and an uplink OFDM sub-frame, and an OFDMA sub-frame comprises a downlink OFDMA sub-frame and an uplink OFDMA sub-frame.

Figure 4:
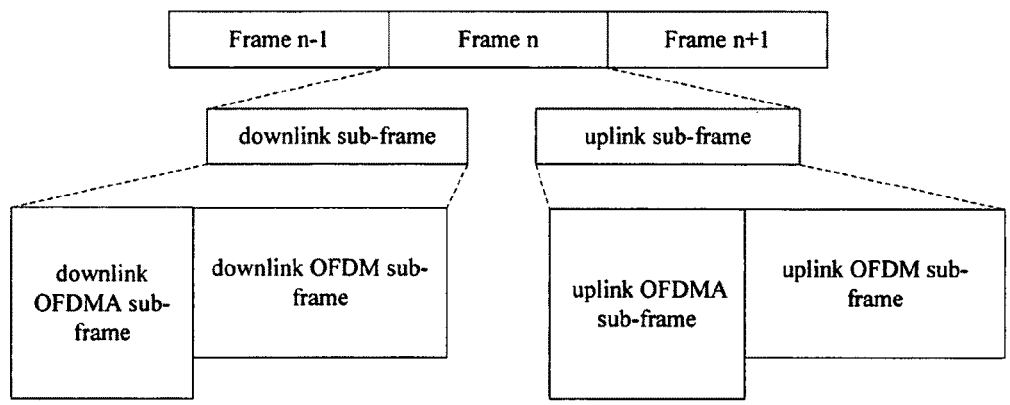
FIG. 4 is the frame format adopted by the first embodiment of the method for assigning the frequency spectrum bandwidth of an OFDM and OFDMA coexistence system according to the present invention.

In this method, the OFDM sub-frame and the OFDMA sub-frame are combined directly in time division fashion, and their combination can be completed in one frame or in an uplink/downlink sub-frame. FIGS. 2 and 3 shows the circumstance that the frequency bands of the OFDM and the OFDMA are the same and the bandwidths of the OFDM and the OFDMA are the same, and as for the circumstance that their frequency bands are the same and their bandwidths are of little difference, the method as shown in FIG. 4 can be adopted. In FIG. 4, a frame firstly is divided into a downlink sub-frame and an uplink sub-frame, and the downlink sub-frame comprises an OFDMA downlink sub-frame and an OFDM downlink sub-frame, and the uplink sub-frame comprises an OFDMA uplink sub-frame and an OFDM uplink sub-frame. If the OFDMA system adopts a sector antenna, and the OFDM and the OFDMA systems adopt the same radio frequency system, the OFDM sub-frame can send the same contents in every sector. In FIG. 4, the lengths of the downmost panes of the OFDM and the OFDMA are different, which aims to show that the frequency band of the OFDMA generally is wider than that of the OFDM. In addition, in FIGS. 4 to 7, the horizontal axis is the time axis, and the vertical axis is the frequency axis.

When the bandwidths of the OFDM sub-frame and the OFDMA sub-frame are different, for example, when the bandwidth of the OFDMA sub-frame is multiple to that of the OFDM sub-frame, the method for utilizing the frequency spectrum according to the second, third and fourth embodiments can be adopted.

The second method for utilizing the frequency spectrum comprises the following steps:

the base station system divides each data frame on the whole frequency band into two parts on the time axis, and one part is the downlink data and the other part is the uplink data;

the base station system divides the downlink sub-frame into two parts (which can be continuous or non-continuous) by time, and one part is used for sending the OFDMA downlink data, and the other part is used for sending the OFDM downlink data;

the region for sending the OFDMA downlink data send an OFDMA downlink sub-frame according to the requirements of networking;

the region for sending the OFDM downlink data is divided into multiple sub-frequency bands by frequency domain, and an OFDM downlink sub-frame is sent in each sub-frequency band and the data in different frequency bands are sent in different sectors, and the frequency bands can be separated by a protection band;

the base station system divides the uplink sub-frame into two parts on the time axis, and one part is used for sending the OFDMA uplink data and the other part is used for sending the OFDM uplink data;

the region for sending the OFDMA uplink data send an OFDMA uplink sub-frame according to the requirements of networking; and the region for sending the OFDM uplink data is divided into multiple sub-frequency bands (which can be divided evenly or unevenly, but generally evenly) by frequency domain, and an OFDM uplink sub-frame is sent in each sub-frequency band and the data in different frequency bands are sent in different sectors, and the frequency bands are separated by a protection band.

The method for utilizing the frequency spectrum according to the present embodiment can also be that the base station system firstly divides a frame into two parts, and one part is used for sending the OFDMA data and the other part is used for sending the OFDM data, and the region for sending the OFDMA data comprises a downlink OFDMA sub-frame and an uplink OFDMA sub-frame, and the OFDM data part is divided into multiple sub-frequency bands by frequency domain, an OFDM downlink sub-frame and an uplink sub-frame are sent in each sub-frequency band, and the data in different frequency bands are sent in different sectors, and the frequency bands are separated by a protection band.

Figure 5:
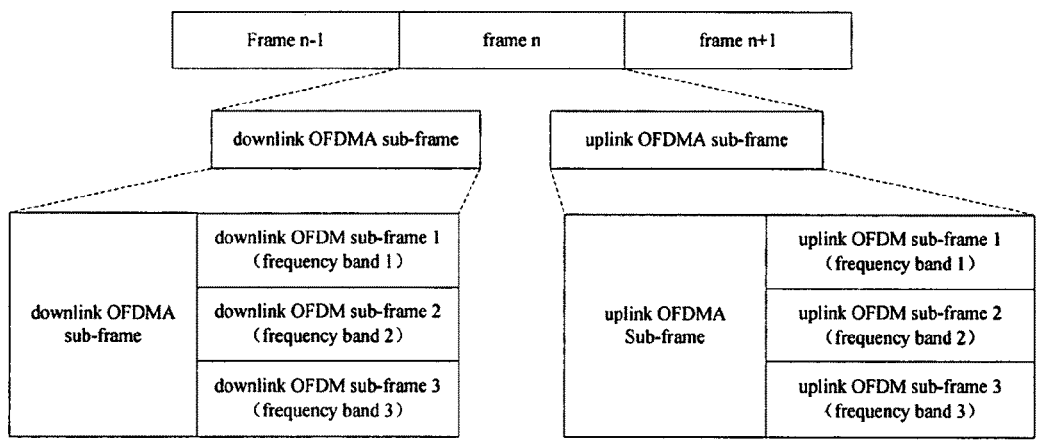
FIG. 5 is the frame format adopted by the second embodiment of the method for assigning the frequency spectrum bandwidth of an OFDM and OFDMA coexistence system according to the present invention.

The FIG. 5 shows the frame structure adopted by the second embodiment of the present invention. An OFDM and OFDMA coexistence system frame comprises a downlink sub-frame and an uplink sub-frame, and one uplink/downlink sub-frame respectively comprise an OFDMA sub-frame and an OFDM sub-frame, and the whole frequency band of the OFDMA system is divided into multiple sub-frequency bands, and each OFDM sub-frame occupies certain sub-frequency bands, and certain protection bands are needed between the sub-frequency bands in order to, prevent the interference of the OFDM signal between the sub-frequency bands. For example, the whole frequency band can be divided into 3 sub-frequency bands, and the OFDM sub-frames of each sub-frequency band are sent in a different sector, and different contents are sent in different sectors. At this time, the OFDMA sub-frame still adopts frequency division networking, and the utilization rate of frequency spectrum of the whole OFDMA system frame is improved by the division of the sub-frequency bands. Of course, the combination of the OFDM sub-frame and the OFDMA sub-frame can also be completed in the whole frame, and at this time, a frame can firstly be combined by an OFDM sub-frame and an OFDMA sub-frame in time division fashion, and an OFDM sub-frame can be further divided into an OFDM downlink sub-frame and an OFDM uplink sub-frame, and an OFDMA sub-frame can also be divided into an OFDMA downlink sub-frame and an OFDMA uplink sub-frame. Wherein, the OFDM sub-frame sends different contents in different sub-frequency bands for use in different sectors.

In the third embodiment, the said method comprises the following steps:

the base station system divides each data frame on the whole frequency band into two parts, one part is a downlink sub-frame and the other part is an uplink frame;

the base station system divides the downlink sub-frame into two sub-frequency bands by frequency domain, and the first sub-frequency band is used for sending the OFDMA downlink sub-frame, and at the second sub-frequency band, the OFDMA downlink sub-frame and the OFDM downlink sub-frame are combined in time division fashion, and the two parts respectively occupy only part of the time of the downlink sub-frame; and the base station system divides the uplink sub-frame into two sub-frequency bands by frequency domain, and the first sub-frequency band is used for sending the OFDMA uplink sub-frame, and at the second sub-frequency band, the OFDMA uplink sub-frame and the OFDM uplink sub-frame are combined in time division fashion, and the two parts respectively occupy only part of the time of the uplink sub-frame.

Figure 6:
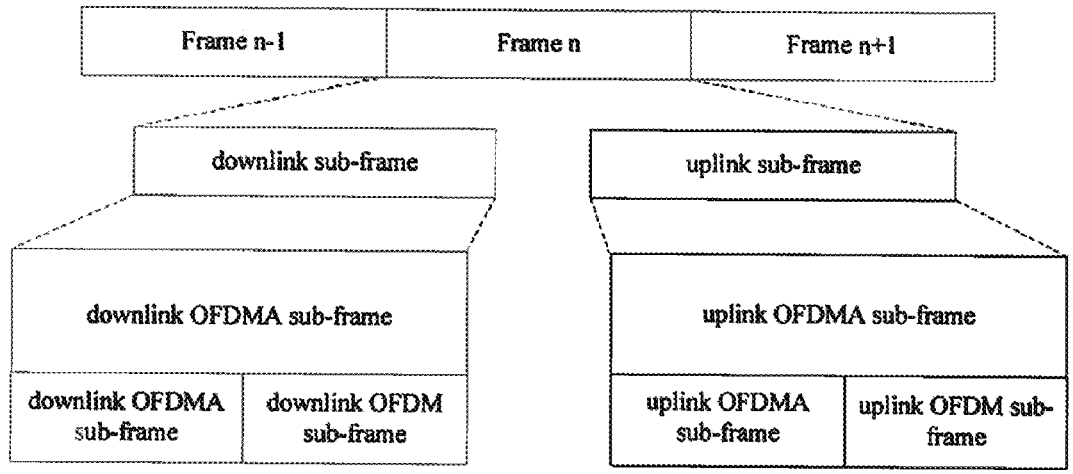
FIG. 6 is the frame format adopted by the third embodiment of the method for assigning the frequency spectrum bandwidth of an OFDM and OFDMA coexistence system according to the present invention.

The FIG. 6 shows the frame structure adopted by the third embodiment of the present invention. An OFDMA system frame of a compatible OFDM system comprises a downlink sub-frame and an uplink sub-frame. In order to improve the utilization rate of the frequency spectrum, first, the whole frequency band is divided into two sub-frequency bands, and the first sub-frequency band is used for sending the OFDMA uplink/downlink sub-frames, and at the second sub-frequency band, the OFDMA uplink/downlink sub-frames and the OFDM uplink/downlink sub-frames are combined in time division fashion. The bandwidths of the OFDMA sub-frames on the first and the second sub-frequency bands can be the same or different, and the FFT dots of the OFDMA sub-frames on the first and the second sub-frequency bands can be the same or different. If the OFDMA system adopts the sector antenna and the OFDM and the OFDMA systems adopt the same radio frequency system, the OFDM sub-frame can adopt the same frequency in different sectors to send the same contents.

In the fourth embodiment, the method comprises the following steps:

the base station system divides the data frame of the whole frequency band into two parts, one part is used for sending the OFDMA downlink data, and the other part is used for sending the OFDMA uplink data;

a region for transmitting the OFDM downlink sub-frame is divided in a OFDMA non-prefix downlink data region; and the base station system divides, in an OFDMA uplink data region, a region for sending the OFDM uplink sub-frame.

Figure 7:
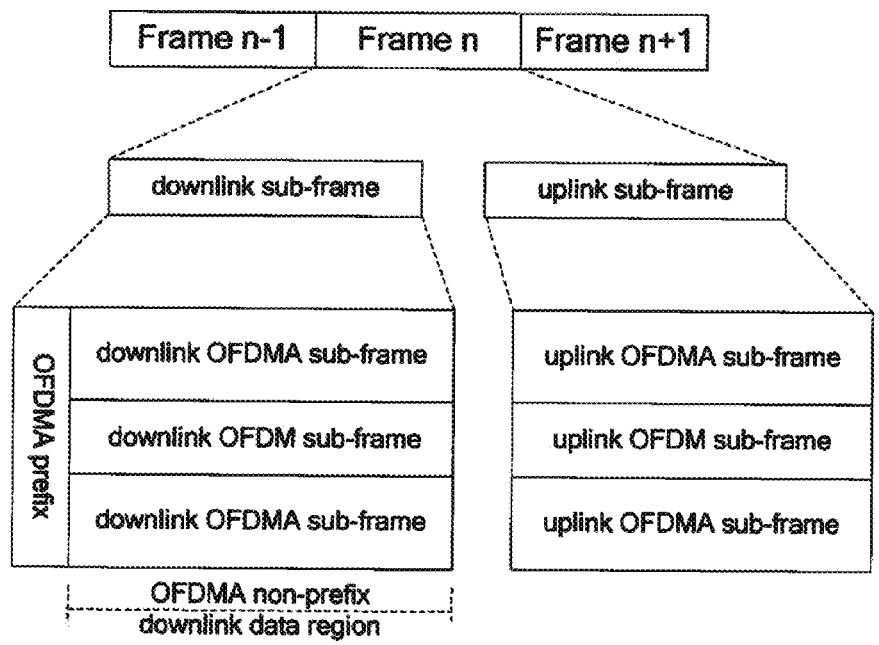
FIG. 7 is the frame format adopted by the fourth embodiment of the method for assigning the frequency spectrum bandwidth of an OFDM and OFDMA coexistence system according to the present invention.

The FIG. 7 shows the frame structure adopted by the fourth embodiment of the present invention. When the OFDMA system adopts a continuous sub-carrier assigning fashion, a data region for sending the uplink/downlink sub-frames of the OFDM system can be divided from the OFDMA uplink/downlink sub-frames, and the positions of the OFDM uplink/downlink sub-frames in the OFDMA uplink/downlink sub-frames can be adjusted according to the actual situations. In order to avoid the mutual interference between the OFDM data and the OFDMA data, a certain protection region should be divided around the OFDM sub-frame. And as the order of the OFDM and the OFDMA assigned by frequency is random, namely, FIG. 7 only shows one of the circumstances, and in fact, the uplink/downlink position of the OFDMA and the OFDM sub-frames can be unfixed.

According to the actual situations (such as the frequency band, bandwidth, the number of the FFT dots, the complexity of realization) of the system, selecting the different solutions above-mentioned for utilizing the frequency spectrum of an OFDM and OFDMA coexistence system can achieve a higher frequency spectrum utilization efficiency.

While the present invention has been particularly shown and described with reference to the embodiments thereof, it will be understood by those skilled in the art that any amendment or equivalent replacement made to the technical solution of the present invention without departing from the spirit and scope of the present invention shall all be covered by the scope of the claims of the present invention.

INDUSTRIAL APPLICABILITY

The method for assigning frequency spectrum bandwidth according to the present invention can achieve a higher frequency spectrum utilization efficiency of an OFDM and OFDMA coexistence system, and can avoid the waste of the frequency spectrum resource provided by service providers; and the method for assigning frequency spectrum bandwidth according to the present invention can also realize more flexible networking.

What is claimed is:

1. A method for assigning frequency spectrum bandwidth of an OFDM and OFDMA coexistence system, and the coexistence system comprises a base station system, characterized in that the base station system combines uplink and downlink data containing an OFDM sub-frame and an OFDMA sub-frame in a time division fashion, constitutes a frame structure realizing the coexistence of the OFDM and the OFDMA, and assigns the frequency spectrum according to the different bandwidth requirements of the OFDM and the OFDMA and the use situation of the frequency band;

when the total frequency bands of the OFDM and the OFDMA are the same and the bandwidths of the OFDM and the OFDMA are different, the method for assigning the frequency spectrum bandwidth of the system comprises the following steps:

the base station system divides each data frame of the whole frequency band into a downlink OFDMA sub-frame and an uplink OFDMA sub-frame on the time axis, which are respectively for sending the OFDMA downlink data, and part of them is used for sending the OFDMA uplink data, wherein the said downlink OFDMA sub-frame also comprises an OFDMA preamble region;

the base station system divides, in a OFDMA non-prefix downlink data region according to frequency assigned order, a region for transmitting the OFDM downlink sub-frame; and the base station system divides, in an OFDMA uplink data region according to the frequency assigned order, a region for transmitting the OFDM uplink sub-frame.

2. The method for assigning frequency spectrum bandwidth of an OFDM and OFDMA coexistence system according to claim 1, characterized in that when the OFDM and OFDMA adopt the same frequency band, and the bandwidths are the same, the method for assigning the frequency spectrum bandwidth of the system comprises the following steps:

the base station system divides each data frame on the whole frequency band into a non-continuous downlink sub-frame and a uplink sub-frame on the time axis, which are respectively for transmitting downlink data and receiving uplink data;

the base station system divides the downlink sub-frame into an OFDMA downlink sub-frame and an OFDM downlink sub-frame on the time axis, which are respectively for transmitting the OFDMA downlink sub-frame data and the OFDM downlink sub-frame data; and the base station system divides the uplink sub-frame into an OFDMA uplink sub-frame and an OFDM uplink sub-frame on the time axis, which are respectively for transmitting the OFDMA uplink sub-frame data and the OFDM uplink sub-frame data.

3. The method for assigning frequency spectrum bandwidth of an OFDM and OFDMA coexistence system according to claim 2, characterized in that the dividing of the said downlink data region and/or the uplink data region can be continuous or non-continuous.

4. The method for assigning frequency spectrum bandwidth of an OFDM and OFDMA coexistence system according to claim 1, characterized in that when the OFDM and the OFDMA adopt the same frequency band, and their bandwidths are the same, the method for assigning the frequency spectrum bandwidth of the system comprises the following steps:

the base station system divides a frame into an OFDMA sub-frame and an OFDM sub-frame by time, which are respectively for sending the OFDMA data and the OFDM data;

the base station system divides the OFDMA sub-frame into a downlink OFDMA sub-frame and an uplink OFDMA sub-frame; and the base station system divides the OFDM sub-frame into a downlink OFDM sub-frame and an uplink OFDM sub-frame.

5. The method for assigning frequency spectrum bandwidth of an OFDM and OFDMA coexistence system according to claim 1, characterized in that when the total frequency bands of the OFDM system and the OFDMA system are the same, and the bandwidths of OFDM Symbol and OFDMA Symbol are different, the method for assigning the frequency spectrum bandwidth of the system comprises the following steps:

the base station system divides each data frame on the whole frequency band into a downlink sub-frame and an uplink sub-frame on the time axis;

the base station system divides the downlink sub-frame into a downlink OFDMA sub-frame and a downlink OFDM sub-frame by time, which are respectively for sending the OFDMA downlink data and the OFDM downlink data;

the region for sending the OFDMA downlink data sends an OFDMA downlink sub-frame according to the requirements of networking;

the region for sending the OFDM downlink data is divided into multiple sub-frequency bands by frequency domain, and an OFDM downlink sub-frame is sent in each sub-frequency band and the data in different frequency bands may be sent in different sectors;

the base station system divides the uplink sub-frame into an uplink OFDMA sub-frame and an uplink OFDM sub-frame on the time axis, which are respectively for sending the OFDMA uplink data and the OFDM uplink data;

the region for sending the OFDMA uplink data sends an OFDMA uplink sub-frame according to the requirements of networking; and the region for sending the OFDM uplink data is divided into multiple sub-frequency bands by frequency domain, and an OFDM uplink sub-frame is sent in each sub-frequency band and the data in different frequency bands may be sent in different sectors.

6. The method for assigning frequency spectrum bandwidth of an OFDM and OFDMA coexistence system according to claim 5, characterized in that the frequency bands of the multiple sub-frequency bands in the region for sending the OFDM uplink data and in the region for sending the OFDM downlink data are separated by protection bands.

7. The method for assigning frequency spectrum bandwidth of an OFDM and OFDMA coexistence system according to claim 1, characterized in that when the total frequency bands of the OFDM system and the OFDMA system are the same, and the bandwidths of OFDM Symbol and OFDMA Symbol are different, the method for assigning the frequency spectrum bandwidth of the system comprises the following steps:

the base station system divides each data frame on the whole frequency band into an OFDMA sub-frame and an OFDM sub-frame on the time axis;

the base station system divides the OFDMA sub-frame into a downlink OFDMA sub-frame and an uplink OFDMA sub-frame by time; and the base station system divides the OFDM sub-frame into multiple sub-frequency bands by frequency domain, and an OFDM downlink sub-frame and an uplink sub-frame are sent in each sub-frequency band and the data in different frequency bands may be sent in different sectors.

8. The method for assigning frequency spectrum bandwidth of an OFDM and OFDMA coexistence system according to claim 7, characterized in that the frequency bands of the multiple sub-frequency bands are separated by protection bands.

9. The method for assigning frequency spectrum bandwidth of an OFDM and OFDMA coexistence system according to claim 1, characterized in that when the total frequency bands of the OFDM system and the OFDMA system are the same and the bandwidths of OFDM symbol and OFDMA symbol are different, the method for assigning the frequency spectrum bandwidth of the system comprises the following steps:

the base station system divides each data frame of the whole frequency band into two parts by time, one part is a downlink sub-frame and the other part is an uplink frame;

the base station system divides the downlink sub-frame into two sub-frequency bands by frequency domain, and the first sub-frequency band is used for sending the OFDMA downlink sub-frame, and at the second sub-frequency band, the OFDMA downlink sub-frame and the OFDM downlink sub-frame are combined in time division fashion, and the two parts respectively occupy only part of the time of the downlink sub-frame; and the base station system divides the uplink sub-frame into two sub-frequency bands by frequency domain, and the first sub-frequency band is used for sending the OFDMA uplink sub-frame, and at the second sub-frequency band, the OFDMA uplink sub-frame and the OFDM uplink sub-frame are combined in time division fashion, and the two parts respectively occupy only part of the time of the uplink sub-frame.

* * * * *